Figure 3:
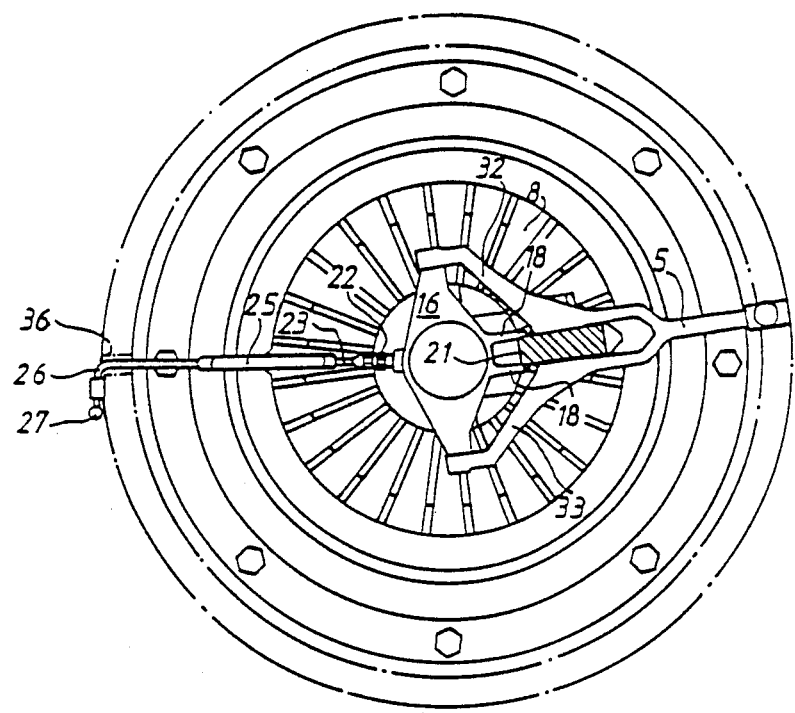

United States Patent [19]

Lionell

[11] Patent Number: 4,969,547
[45] Date of Patent: Nov. 13, 1990

[54] ARRANGEMENT FOR CENTERING A BEARING UNIT OF A PULL-TYPE CLUTCH

[75] Inventor: Hakan Lionell, Södertälje, Sweden
[73] Assignee: Saab-Scanie Aktiebolag, Sweden
[21] Appl. No.: 326,661
[22] PCT Filed: Jun. 15, 1988
[86] PCT No.: PCT/SE88/00323
 § 371 Date: Mar. 2, 1989
 § 102(e) Date: Mar. 2, 1989
[87] PCT Pub. No.: WO89/00251
 PCT Pub. Date: Jan. 12, 1989

[30] Foreign Application Priority Data

Jul. 3, 1987 [SE] Sweden ............................ 8702742

[51] Int. Cl.[5] ....................... F16D 13/74; F16D 23/14
[52] U.S. Cl. ................... 192/98; 192/110 B; 192/113 R
[58] Field of Search ............... 192/98, 110 B, 113 R

[56] References Cited

U.S. PATENT DOCUMENTS

| | | | |
|---|---|---|---|
| 2,068,579 | 1/1937 | Tatter | 192/113 R X |
| 2,533,568 | 12/1950 | Erskine | 192/113 R X |
| 3,610,384 | 10/1971 | Borck | 192/98 X |
| 4,117,917 | 10/1978 | Ladin et al. | 192/98 |
| 4,560,052 | 12/1985 | Renaud | 192/98 |
| 4,660,702 | 4/1987 | Flotow | 192/98 |
| 4,687,084 | 8/1987 | Leigh-Monstevens et al. | 192/98 X |

FOREIGN PATENT DOCUMENTS

| | | | |
|---|---|---|---|
| 2815971 | 10/1979 | Fed. Rep. of Germany | 192/98 |
| 3218325 | 12/1982 | Fed. Rep. of Germany | 192/110 B |
| 920355 | 4/1947 | France | 192/113 R |
| 2533650 | 3/1984 | France | 192/98 |
| 451211 | 9/1987 | Sweden . | |

Primary Examiner—Rodney H. Bonck
Attorney, Agent, or Firm—Ostrolenk, Faber, Gerb & Soffen

[57] ABSTRACT

Upon fitting of a so-called pull-type clutch between engine and gearbox in vehicles, difficulties arise in achieving correct coupling between the declutching mechanism and the declutching bearing during bringing together of engine and gearbox. A bearing unit including a declutching bearing is freely rotatable in a pre-assembled condition and needs to be centered in a certain angular position for correct coupling to be obtained. In order to achieve this centering of the angular position of the bearing unit it is proposed according to the invention that the bearing unit is connected to a housing, which is fixed relative to the engine, via an extensible element by which the angular position may be fixed.

7 Claims, 2 Drawing Sheets

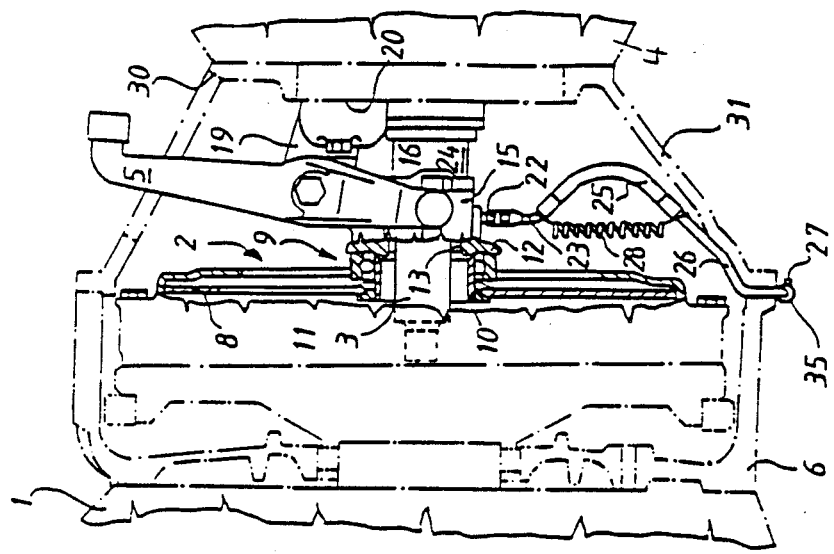
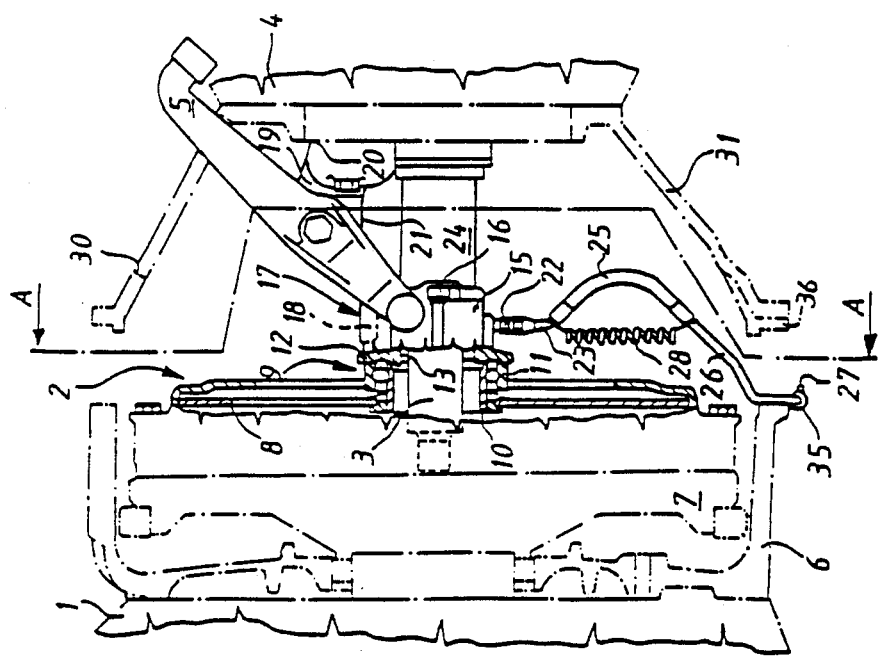

ARRANGEMENT FOR CENTERING A BEARING UNIT OF A PULL-TYPE CLUTCH

The present invention relates to an arrangement for centering the angular position of a bearing unit for a declutching bearing.

So-called pull-type clutches on the drive units of motor vehicles have advantages with regard to function, service life and manufacturing costs when compared with so-called push-type clutches. The latter, however, have the advantage that they can be fitted simply when engine and gearbox are brought together, since the declutching mechanism only has to press on the declutching bearing.

With a pull-type clutch, on the other hand, a coupling is required between the declutching bearing and the declutching mechanism. Since it is difficult, when engine and gearbox are brought together, to reach the declutching bearing and the declutching mechanism from the outside, it is desirable that the coupling as well as the uncoupling of these takes place substantially automatically.

In the event that the declutching mechanism includes a declutching fork, its legs must then be moved, while engine and gearbox are brought together, into a position behind the lugs or the like which are generally found formed on the declutching bearing for interaction with the legs.

A solution for achieving this is previously known from Swedish patent application No. 8501248-2. In this wire spring arranged on the declutching bearing is used to interact with the legs of the declutching fork. With the rotatable declutching bearing and with it the wire spring in a pre-set angular position, the legs of the likewise pre-set declutching fork are then caused to move towards the wire spring, while engine and gearbox are brought together, so that the legs of the fork are moved to a position behind the lugs of the declutching bearing.

The known solution referred to has disadvantages when applied to freely rotatable declutching bearings which, as a consequence of a nonsymmetrical construction, can scarcely be pre-set in the angle of rotation position which is required in order that the desired interaction with the declutching fork can take place.

The aim of the present invention is to achieve an arrangement as stated at the outset in which the disadvantages referred to are eliminated. To this end the invention is directed toward an extensible element connected to the bearing unit, and also connected, for example, to the housing around the engine, for action upon the bearing unit to set an angular position of the bearing unit. The bearing unit is an assembly which is preassembled to and is rotatable relative to the clutch. The objective is to prevent the bearing unit from freely rotating and to set the angular orientation of the bearing unit.

By virtue of the presence of the connecting element, which is referred to there and which fixes the angular position, between the declutching bearing housing and the housing which is fixed relative to the engine, the declutching bearing can be pre-set at the precise angular position in which to be correctly brought together with the legs of the declutching fork. The displaceability of the declutching bearing which is necessary for the declutching movement during normal operation of the vehicle can be achieved, notwithstanding the connecting element, by virtue of the stated extensibility.

A further aim of the present invention has been to integrate, by means of the connecting element, a lubricant transfer to a sliding bearing situated in the declutching bearing. In one embodiment of the invention, therefore, the connecting element includes a flexible pipe which makes it possible to supply lubricant to the sliding bearing of the declutching bearing from outside.

Other features characterizing the invention emerge from the accompanying patent claims and the following description of an embodiment illustrating the invention. In the description reference is made to the accompanying figures in which FIG. 1 shows partial schematically reproduced view from above of an arrangement according to the invention before an imminent bringing together of engine and gearbox, FIG. 2 shows the said arrangement after bringing together, and FIG. 3 shows essentially a section along A—A in FIG. 1.

It can be seen from FIG. 1 how a bearing unit 1 for a declutching bearing 2 is pre-assembled. The arrangement shown in the figures comprises a clutch 2 which is mounted on an engine 1 and which is brought, from a position before bringing together, by means of an axle 3 moving into a gearbox 4 and also by means of a declutching fork 5 mounted on the gearbox to an assembled operating position according to FIGS. 2 and 3. The clutch 2 according to the arrangement according to the invention is of the conventional friction disc type which does not constitute part of the present invention and is consequently not described in greater detail here. It can be seen from FIGS. 1 and 2 how the clutch 2 is surrounded by a flywheel housing 6 which is fixed to the engine 1. A diaphragm spring 8, which is nonrotatably connected to the flywheel 7 of the engine in a conventional manner which is not described here in greater detail, is attached centrally to the one inner ball race 10 of the declutching bearing 9. The other outer ball race 11 of the declutching bearing is firmly fixed in a housing 12 which has a radially inward-turned cylindrical casing surface 13. Together with the declutching bearing 9 the housing 12 is henceforward referred to as the bearing unit 15.

The bearing unit 15 has an axial cylindrical hole running through it which is limited by the casing surface 13 and through which the inward moving axle 3 of the gearbox extends. Furthermore, the housing 12 of the bearing unit is provided with radially projected lugs 16, one on each side of the housing. In between the housing is designed with a guide element 17 in the form of two legs 18 which are positioned radially and in a peripheral direction at a distance from one another. The said lugs 16 and the guide element are intended to interact with the declutching fork 5 which is fixed to the gearbox. The fork is pivotably mounted on a bearing bracket 19 which is fixed to the end wall 20 of the gearbox. The bearing bracket 19 is designed with a guide boss 21 which engages between the legs 18 of the guide element 17 in order to prevent turning of the bearing unit 15 during operation.

In addition, the bearing unit 15 is provided with a radial boring (not shown). To this is fixed a connection 22 to a tube 23 for the supply of lubricant via the boring to the hole through the bearing unit 15. The cylindrical inner surface 13 of the hole in fact forms a sliding bearing together with a stay tube 24 which encloses the axle 3 and is fixed to the gearbox 4. The said sliding bearing makes possible axial displaceability between the bearing unit 15 and the stay tube 24 for carrying out the necessary declutching movement during normal operation of the vehicle.

The supply of lubricant is intended to take place at predetermined service times for the vehicle. To the tube 23, therefore, a flexible hose 25 is attached which, at its radially outer end, is connected via a further tube 26 to a lubricator nipple 27 located outside the flywheel housing. Parallel with the hose 25 a tension spring 28 extends between the metal tubes 23, 26. Both the hose 25 and the spring 28 are designed as an extensible element which, during operation, makes possible the necessary declutching movement. In all positions, however, the tension spring 28 exerts a tensile force between the tubes 23, 26 and thus exerts a force for fixing the angular position on the bearing unit 15.

The radially outer part of the declutching fork 5 passes through an opening 30 made for this purpose in a clutch housing 31 which is fixed to the gearbox. Outside the clutch housing 31 the outer end of the declutching fork interacts, in a way which is not shown here, with a piston rod issuing from a compressed air cylinder which is part of a manually actuable manoeuvring mechanism for the clutch.

The radially inner part of the declutching fork consists of two legs 32, 33 which are intended to grip around the bearing unit 15. The ends of the legs 32, 33 are thus intended to interact with the lugs 16 of the bearing unit by assuming a position by the side of the lugs 16 which is turned away from the gearbox.

It can be seen from FIG. 1 how the declutching fork 5, before bringing together of the gearbox and engine, has been pulled back to its maximum rearward position. Both the declutching fork 5 and the extensible element 25, 28 have an essentially horizontal extension which has the effect that the bearing unit 15, which is freely rotatable during bringing together, tends to turn itself, under the influence of gravity, out of a correct angular position for bringing together. According to the invention, however, the bearing unit 15 can be centred by attaching the outer section of tube 26 of the lubricant pipe 23, 25, 26 to the flywheel housing in a pre-determined position. This can be done either by mounting the outer section of tube 26 in a pre-determined hole in the flywheel housing 6 or by providing the outer section of tube 26- as is the case in the figures- with a catch 35 which can grip around the edge of the flywheel housing 6 close by a pre-determined mark on the housing 6.

The last-mentioned solution means that minor adjustments to the angular position of the bearing unit 15 can be made simply from outside in order to facilitate the passing of the declutching fork 5 between the legs 18 of the guide element 17.

During bringing together the inward moving axle 3 of the gearbox 4 and its surrounding stay tube 24 are first passed into the hole in the bearing unit 15. The ends of the legs 32, 33 of the declutching fork 5 are then moved to a position seen from the engine side in front of the lugs 16 of the bearing unit 15 according to FIG. 1 at the same time as the guide boss 21 is moved in between the legs 18 of the guide element 17. When bringing together is completed by the housings 6, 31 having come into contact with one another, the ends of the legs of the declutching fork are brought into contact with the lugs 16 by manual actuation of the manoeuvring mechanism of the clutch. In the clutch housing a recess 36 is formed in which the tube 26 is accommodated when the housings 6, 31 make contact with one another.

The above exemplary embodiment is not intended to have a limiting effect on the invention but it can be modified, within the scope of the following claims, in a number of embodiments. Thus, the extensible element 25, 28 between the bearing unit 15 and the flywheel housing 6 does not necessarily have to contain a lubricant pipe if, for example, the sliding bearing between the bearing unit 15 and the stay tube 24 is of a permanently lubricated type. In such a case it can be designed with just one extensible spring of the type shown in the figures or in the form of a plate spring. Nor does the extensibility in itself need to be achieved by means of a spring but can be achieved, for example, with a double pivoted connecting element between the bearing unit 15 and the flywheel housing 6. The flexibility of the element should then simply make possible the displaceability of the bearing unit 15 in an axial direction but not allow any turning of the bearing unit 15 around the inward moving axle 3.

I claim:

1. An arrangement for centering the angular position of a bearing unit for a declutching bearing on a pull-type clutch, wherein the clutch connects an engine, on the one hand, with a gear box, on the other hand, and wherein the gear box and the engine are initially separated and are movable together, the clutch having an axis, the clutch being affixed to the engine for rotating therewith, the arrangement comprising:

a bearing unit having an axis which is generally parallel to the axis of the clutch, the bearing unit being rotatable around its axis relative to the clutch, the bearing unit being preassembled to the clutch and thereby to the engine;

a declutching mechanism attached to the gear box, the declutching mechanism being engageable with the bearing unit and cooperating with the bearing unit after the gear box and the engine have been moved together;

a housing fixed in position in relation to rotation of the engine; and an extensible element connected between the bearing unit and the housing, and a tension spring attached to the extensible element and maintaining the extensible element in tension so that the extensible element fixes the angular position of the bearing unit around its axis at a predetermined angular position so that the bearing unit is in an adjusted position suitable for receiving and connecting with the declutching mechanism prior to the bringing together of the gear box and the engine;

the declutching mechanism being movable from a position out of engagement with the bearing unit to a position in engagement with the bearing unit when the bearing unit is in the adjusted position.

2. The arrangement of claim 1, wherein the extensible element further includes a flexible pipe extending into the bearing unit for transferring lubricant through the pipe to the bearing unit, the spring being connected in parallel to the pipe at locations along the length of the pipe, the spring acting upon the bearing unit by acting upon the flexible pipe.

3. The arrangement of claim 2, wherein the extensible element includes a non-flexible tube connected to the flexible pipe and extending from the flexible pipe to the fixed housing, the non-flexible tube having an inlet for lubricant.

4. The arrangement of claim 3, wherein the bearing unit includes a sliding bearing therein and the flexible pipe is connected to the sliding bearing for delivery of lubricant.

5. The arrangement of claim 3, wherein the fixed housing has an edge, the extensible element including a catch for gripping the edge of the housing in a preselected position along the edge of the housing angular position of the bearing unit.

6. The arrangement of claim 1, wherein the fixed housing has an edge, the extensible element including a catch for gripping the edge of the housing at a preselected location along the edge.

7. The arrangement of claim 1, wherein the declutching mechanism includes an arm pivotally supported on the gear box, the arm including engaging means for engaging the bearing unit, the bearing unit including engageable means thereon for being engaged by the engaging means of the arm, the engageable means of the bearing unit being placed so as to be engageable by the engagement means of the arm only when the bearing unit is at a preselected angular orientation around its axis, and at that angular orientation, the arm can pivot into engagement on a side of the engageable means of the bearing unit facing away from the gear box.

* * * * *